(12) United States Patent
Hada et al.

(10) Patent No.: US 6,260,880 B1
(45) Date of Patent: Jul. 17, 2001

(54) VEHICLE TRAVEL SAFETY DEVICE

(75) Inventors: Satoshi Hada; Yoichi Sugimoto; Shoji Ichikawa; Yoshihiro Urai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,340

(22) Filed: Oct. 12, 1999

(30) Foreign Application Priority Data

Oct. 15, 1998 (JP) .................................................. 10-294075

(51) Int. Cl.⁷ .................................................. B60R 21/32
(52) U.S. Cl. .......................... 280/735; 180/268; 180/282
(58) Field of Search .................................. 280/735, 734; 180/268, 271, 282; 303/193

(56) References Cited

U.S. PATENT DOCUMENTS

| | | | | |
|---|---|---|---|---|
| 3,735,398 | * | 5/1973 | Ross | 342/21 |
| 3,810,520 | * | 5/1974 | Iwata et al. | 180/282 |
| 4,258,931 | * | 3/1981 | Lee et al. | 280/734 |
| 5,173,859 | * | 12/1992 | Deering | 180/271 |
| 5,697,469 | * | 12/1997 | Klarer et al. | 180/268 |

FOREIGN PATENT DOCUMENTS

| | | |
|---|---|---|
| 3-159838 | 7/1991 | (JP) . |
| 2573248 | 11/1992 | (JP) . |

* cited by examiner

*Primary Examiner*—Paul N. Dickson
*Assistant Examiner*—Faye M. Fleming
(74) *Attorney, Agent, or Firm*—Arent Fox Kintner Plotkin & Kahn, PLLC

(57) ABSTRACT

A vehicle travel safety device carries out automatic braking in order to prevent a subject vehicle from coming into contact with an object, and proximate expansion of an air bag is reliably prevented. When there is a possibility of a subject vehicle coming into contact with an object, automatic braking is carried out in order to prevent the contact. If a seat belt wear state sensor detects that an occupant is not wearing a seat belt and an air bag expansion possibility estimating means estimates that there is a possibility of an air bag expanding, by means of an automatic braking means, the deceleration rate of the automatic braking is reduced so that the occupant is prevented from moving forwards due to the inertia accompanying the braking and causing proximate expansion. When the speed of the subject vehicle at the time when automatic braking is started is high, the relative speed between the subject vehicle and the object at the time when automatic braking is started is high. Thus, the time taken for the subject vehicle to come into contact with the object is short or the speed of the subject vehicle at which it will come into contact with the object is high. Therefore, the air bag expansion possibility estimating means estimates that there is a possibility of the air bag expanding.

24 Claims, 6 Drawing Sheets

VEHICLE TRAVEL SAFETY DEVICE

BACKGROUND OF THE INVENTION

1. Field of the Invention

The present invention relates to a vehicle travel safety device which, in the case where a driver actively carries out a braking operation when it is determined that there is a possibility of the subject vehicle coming into contact with an object, generates a braking force to support the braking operation by the driver.

2. Description of the Prior Art

In the prior art, the distance between the subject vehicle and a vehicle in front is detected by an ultrasonic sensor or an infrared sensor. Automatic braking is carried out when the above-mentioned distance between the vehicles becomes less than a threshold value where there is a possibility that the subject vehicle might come into contact with the vehicle in front. Japanese Utility Model Registration Publication No. 2573248 has proposed that, when an occupant does not wear a seat belt, the deceleration rate of the automatic braking is set at a small value so as to prevent the occupant from moving forwards due to the inertia accompanying the braking.

Furthermore, when considering the difficulty of effectively exhibiting the performance of an air bag in restraining an occupant when proximate expansion of the air bag (expansion of the air bag in a state in which its distance from the occupant is too small) is effected during collision of a vehicle, Japanese Patent Application Laid-Open No. 3-159838 has proposed that the distance between the air bag and the occupant is detected on the basis of the position of the seat on the lengthways slide, the angle of inclination of the seat back, the length of the seat belt that is extended, etc. and the timing of the expansion of the air bag is changed according to the distance.

However, with regard to the above-mentioned Japanese Utility Model Registration Publication No. 2573248, since the problem of proximate expansion of the air bag at a time when automatic braking is operated is not considered, there is a possibility that the performance of the air bag might not be exhibited effectively. Furthermore, with regard to the above-mentioned Japanese Patent Application Laid-Open No. 3-159838, since the distance between the air bag and the occupant is detected in a non-decelerating period, forward movement of the body of the occupant due to the deceleration resulting from automatic braking is not considered and there is a possibility that proximate expansion of the air bag might result.

SUMMARY OF THE INVENTION

The present invention has been conducted in view of the above-mentioned circumstances, and with regard to a vehicle travel safety device which carries out automatic braking in order to prevent a subject vehicle from coming into contact with an object, it is an objective of the present invention to effectively prevent proximate expansion of an air bag.

To achieve the above-mentioned objective, a first aspect of the invention is characterized in that a vehicle travel safety device comprises an object detecting means, a contact possibility determining means, an automatic braking means, an air bag, and a seat belt. The object detecting means detects an object present in the direction in which a subject vehicle travels. The contact possibility determining means determines the possibility of the subject vehicle coming into contact with the detected object. The automatic braking means automatically brakes the subject vehicle when the contact possibility determining means determines that there is a possibility of contact of the subject vehicle with the object. The air bag is expanded by the impact resulting from contact of the subject vehicle with the object so as to protect an occupant. The seat belt restrains the occupant in a seat. The device further comprises a seat belt wear state detecting means which detects the state in which the seat belt is worn by the occupant and an air bag expansion possibility estimating means which estimates the possibility of the air bag expanding at a time when automatic braking is operated by the automatic braking means. The automatic braking means changes the braking force used for automatic braking based on the result of the detecting made by the seat belt wear state detecting means and the result of the estimation made by the air bag expansion possibility estimating means.

With the above-mentioned arrangement, when it is determined that there is a possibility of the subject vehicle coming into contact with an object, the braking force used for the automatic braking is changed based on the state in which the seat belt is worn by the occupant and the possibility of the air bag expanding at a time when automatic braking is carried out in order to prevent contact with the object. Therefore, when there is no possibility of proximate expansion of the air bag, sufficient braking force is generated to prevent contact with the object, and when there is a possibility of proximate expansion of the air bag, the braking force is suppressed so as to prevent the occupant from moving forwards due to the inertia resulting from the braking and approaching the air bag.

The invention described in a second aspect, in addition to the arrangement of the first aspect, comprises a vehicle speed detecting means which detects the speed of the subject vehicle. The air bag expansion possibility estimating means estimates the possibility of the air bag expanding based on the speed of the subject vehicle at the time when the automatic braking means starts automatic braking.

With the above-mentioned arrangement, when the speed of the subject vehicle is high, since it is difficult to prevent contact with the object, it can be determined that there is a high possibility of the air bag expanding, and when the speed of the subject vehicle is low, since it is easy to prevent contact with the object, it can be determined that there is a low possibility of the air bag expanding.

The invention described in the third aspect, in addition to the arrangement of the first aspect, is characterized in that the air bag expansion possibility estimating means estimates the possibility of the air bag expanding based on the relative speed between the subject vehicle and the object detected by the object detecting means.

With the above-mentioned arrangement, when the relative speed between the subject vehicle and the object is high, since it is difficult to prevent contact with the object, it can be determined that there is a high possibility of the air bag expanding. When the relative speed between the subject vehicle and the object is low, since it is easy to prevent contact with the object, it can be determined that there is a low possibility of the air bag expanding.

The invention described in the fourth aspect, in addition to the arrangement of the first aspect, comprises a time estimating means which estimates the time taken for the subject vehicle to come into contact with the object based on a) the speed of the subject vehicle detected by the vehicle speed detecting means, b) the relative speed between the subject vehicle and the object detected by the object detecting means and c) the distance between the subject vehicle and the object detected by the object detecting means. The air bag expansion possibility estimating means estimates the possibility of the air bag expanding based on the time estimated by the time estimating means.

With the above-mentioned arrangement, the time taken for the subject vehicle to come into contact with the object is estimated based on a) the speed of the subject vehicle, b) the relative speed between the subject vehicle and the object detected and c) the distance between the subject vehicle and the object. When the estimated time is short, since it is difficult to prevent contact with the object, it can be determined that there is a high possibility of the air bag expanding. When the estimated time is long, since it is easy to prevent contact with the object, it can be determined that there is a low possibility of the air bag expanding.

The invention described in a fifth aspect, in addition to the arrangement of the first aspect, comprises a contact speed estimating means which predicts the contact speed at the time when the subject vehicle comes into contact with the object based on a) the speed of the subject vehicle detected by the vehicle speed detecting means, b) the relative speed between the subject vehicle and the object detected by the object detecting means and c) the distance between the subject vehicle and the object detected by the object detecting means. The air bag expansion possibility estimating means estimates the possibility of the air bag expanding based on the contact speed estimated by the contact speed estimating means.

With the above-mentioned arrangement, the contact speed at the time when the subject vehicle comes into contact with the object is estimated based on a) the speed of the subject vehicle, b) the relative speed between the subject vehicle and the object detected and c) the distance between the subject vehicle and the object. When the contact speed is high, since the impact from the contact is large, it can be determined that there is a high possibility of the air bag expanding. When the contact speed is low, since the impact from the contact is small, it can be determined that there is a low possibility of the air bag expanding.

The invention described in a sixth aspect is characterized in that when the seat belt wear state detecting means detects that an occupant is not wearing a seat belt, the automatic braking means decreases the braking force used for automatic braking.

With the above-mentioned arrangement, when there is a possibility that the occupant might move forwards and approach the air bag due to inertia if a strong braking force is applied when the occupant is not wearing a seat belt, the braking force used for the automatic braking can be reduced to prevent the occurrence of proximate expansion. Furthermore, when there is no possibility that the occupant might move forwards due to inertia even if a strong braking force is applied when the occupant is wearing a seat belt, sufficient braking force used for automatic braking is generated to effectively prevent contact of the vehicle with the object.

The invention described in a seventh aspect is characterized in that when the air bag expansion possibility estimating means estimates that there is a possibility of the air bag expanding, the automatic braking means decreases the braking force used for automatic braking.

With the above-mentioned arrangement, when there is a possibility of the air bag expanding, it is possible to prevent the occurrence of proximate expansion by decreasing the braking force used for the automatic braking. When there is no possibility of the air bag expanding, it is possible to effectively prevent contact by generating a sufficient level of braking force for the automatic braking.

The invention described in an eighth aspect, in addition to the arrangement of the seventh aspect, comprises a lengthways position detecting means which detects the lengthways position of a seat or an occupant at a time when the automatic braking means is not operating. The automatic braking means changes the braking force used for automatic braking based on the lengthways position of the seat or the occupant detected by the lengthways position detecting means.

With the above-mentioned arrangement, since the braking force used for the automatic braking is changed according to the lengthways position of the occupant or the seat, when the distance between the occupant and the air bag is short, proximate expansion can be more reliably prevented by decreasing the braking force.

The invention described in a ninth aspect, in addition to the arrangement of any one of the first to eighth aspects, comprises a seating state detecting means which detects the seating state of the occupant on the seat. The seat belt wear state detecting means detects a state in which the seat belt is worn by the occupant on the seat which is detected as being in a seating state by the seating state detecting means.

With the above-mentioned arrangement, since the state in which a seat belt is worn is detected for a seat on which the occupant sits, it is possible to prevent meaningless detecting of the state for seats on which no occupants are seated.

BRIEF DESCRIPTION OF THE DRAWINGS

The present invention is described below by reference to the embodiment of the present invention shown in the attached drawings.

FIG. 1 is an overall view of the configuration of a vehicle on which a travel safety device is mounted.

FIG. 2 is a block diagram of the braking system.

FIG. 3 is a block diagram illustrating the components of the circuit of an electronic control unit.

FIG. 4 is a flow chart for explanation of the operation of the embodiment.

FIG. 5 is a perspective view of a driver's seat.

FIG. 6 is a perspective view of the interior part of a vehicle compartment of an automobile.

DESCRIPTION OF THE PREFERRED EMBODIMENTS

Figure 1:
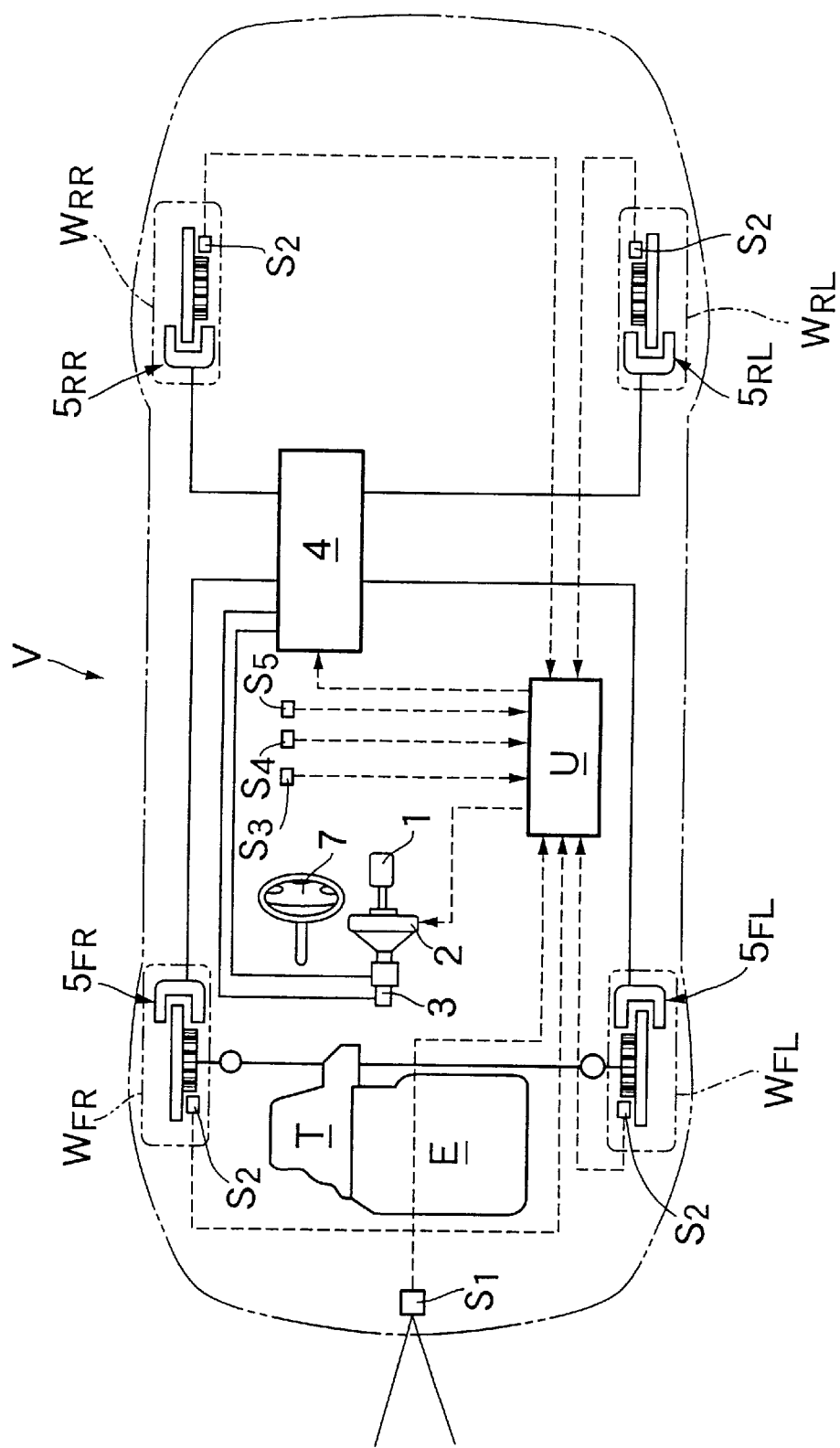
FIG. 1 to FIG. 6 illustrate an embodiment of the present invention.
Figure 2:
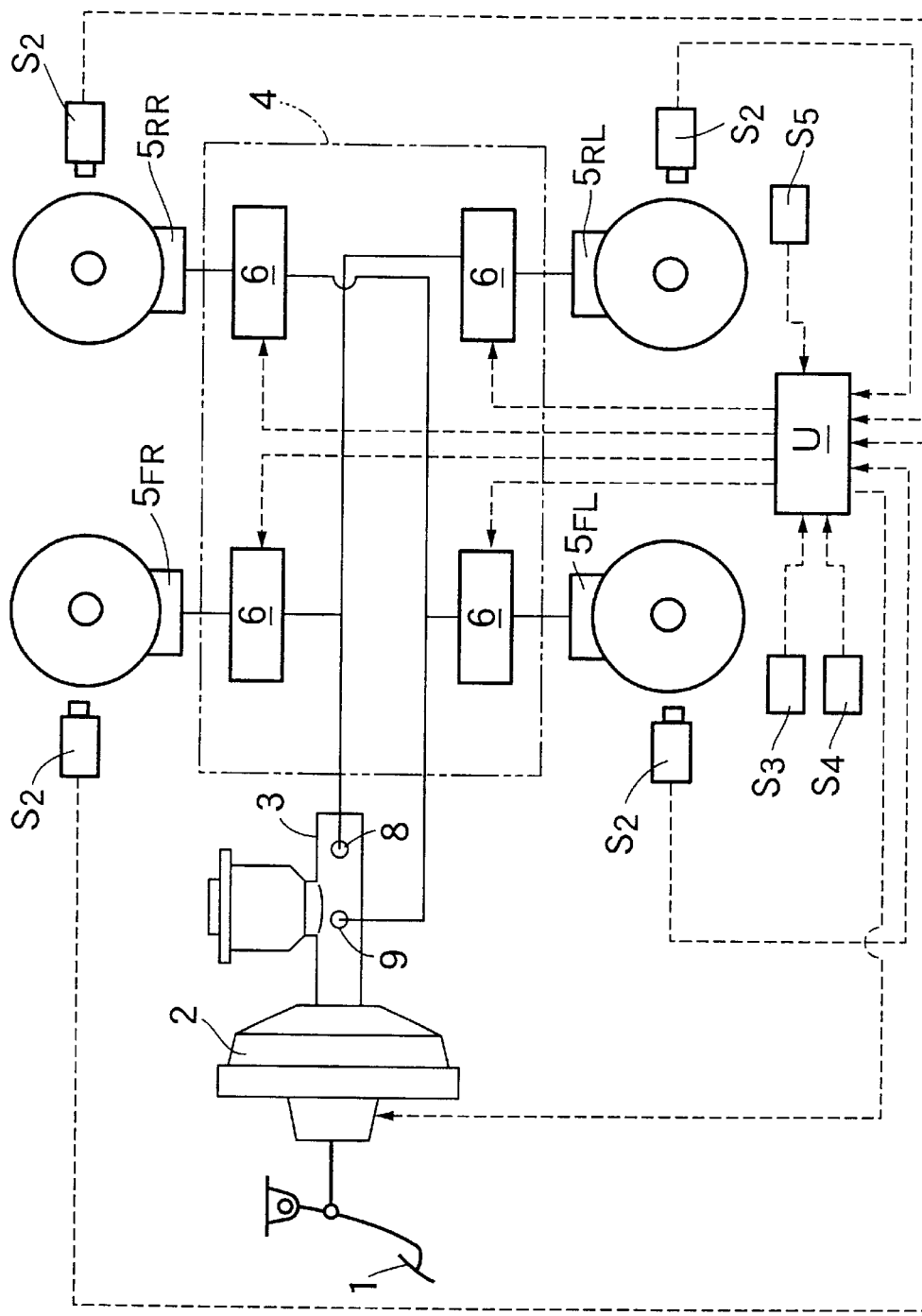

As shown in FIG. 1 and FIG. 2, a four-wheeled vehicle V, on which the travel safety device of the present invention is mounted, comprises right and left front wheels $W_{FR}$, $W_{FL}$ which are driven wheels to which the driving force of an engine E is transmitted via a transmission T and right and left rear wheels $W_{RR}$, $W_{RL}$ which are follower wheels for rotating as the vehicle V travels. A brake pedal 1, which is operated by a driver, is connected to a master cylinder 3 via an electronically controlled vacuum booster 2. The electronically controlled vacuum booster 2 operates the master cylinder 3 by mechanically doubling the depression force applied to the brake pedal 1 and also operates the master cylinder 3 according to a brake command signal from an electronic control unit U regardless of the operation of the brake pedal 1 during assisted braking. When depression force is input to the brake pedal 1 and the brake command signal is input from the electronic control unit U, the electronically controlled vacuum booster 2 outputs a hydraulic brake pressure according to a larger one of the two inputs. In addition, the input rod of the electronically controlled vacuum booster 2 is connected to the brake pedal 1 via a lost motion mechanism. Even when the electronically controlled vacuum booster 2 is operated by a signal from the electronic control unit U and the above-mentioned input rod moves forwards, the brake pedal 1 is designed to remain at its initial position.

A pair of output ports 8, 9 from the master cylinder 3 are connected to brake calipers $5_{FR}$, $5_{FL}$, $5_{RR}$, $5_{RL}$ mounted on the front wheels $W_{FR}$, $W_{FL}$ and the rear wheels $W_{RR}$, $W_{RL}$ via a hydraulic control device 4. The hydraulic control device 4 comprises four pressure regulators 6 . . . corresponding to the four brake calipers $5_{FR}$, $5_{FL}$, $5_{RR}$, $5_{RL}$. Each of the pressure regulators 6 . . . is connected to the electronic control unit U to individually control the operation of the brake calipers $5_{FR}$, $5_{FL}$, $5_{RR}$, $5_{RL}$ which are mounted on the front wheels $W_{FR}$, $W_{FL}$ and the rear wheels $W_{RR}$, $W_{RL}$. If the hydraulic brake pressures which are transmitted to each of the brake calipers $5_{FR}$, $5_{FL}$, $5_{RR}$, $5_{RL}$ by means of the pressure regulators 6 . . . are controlled independently, anti-lock brake control, which suppresses locking of wheels during braking, can therefore be carried out.

To the electronic control unit U is connected a radar device $S_1$ which emits electromagnetic waves, such as laser beam or millimeter waves ahead of the vehicle body, and detects the distance and the relative speed between an object, such as a vehicle in front, and the subject vehicle based on the reflected waves. Wheel speed sensors $S_2$ . . . are also connected to the electronic control unit U and sense the rate of rotation of the front wheels $W_{FR}$, $W_{FL}$ and the rear wheels $W_{RR}$, $W_{RL}$. A seat belt wear state sensor $S_3$, a lengthways position sensor $S_4$ and a seating state sensor $S_5$ are also connected to the electronic control unit U.

Figure 5:
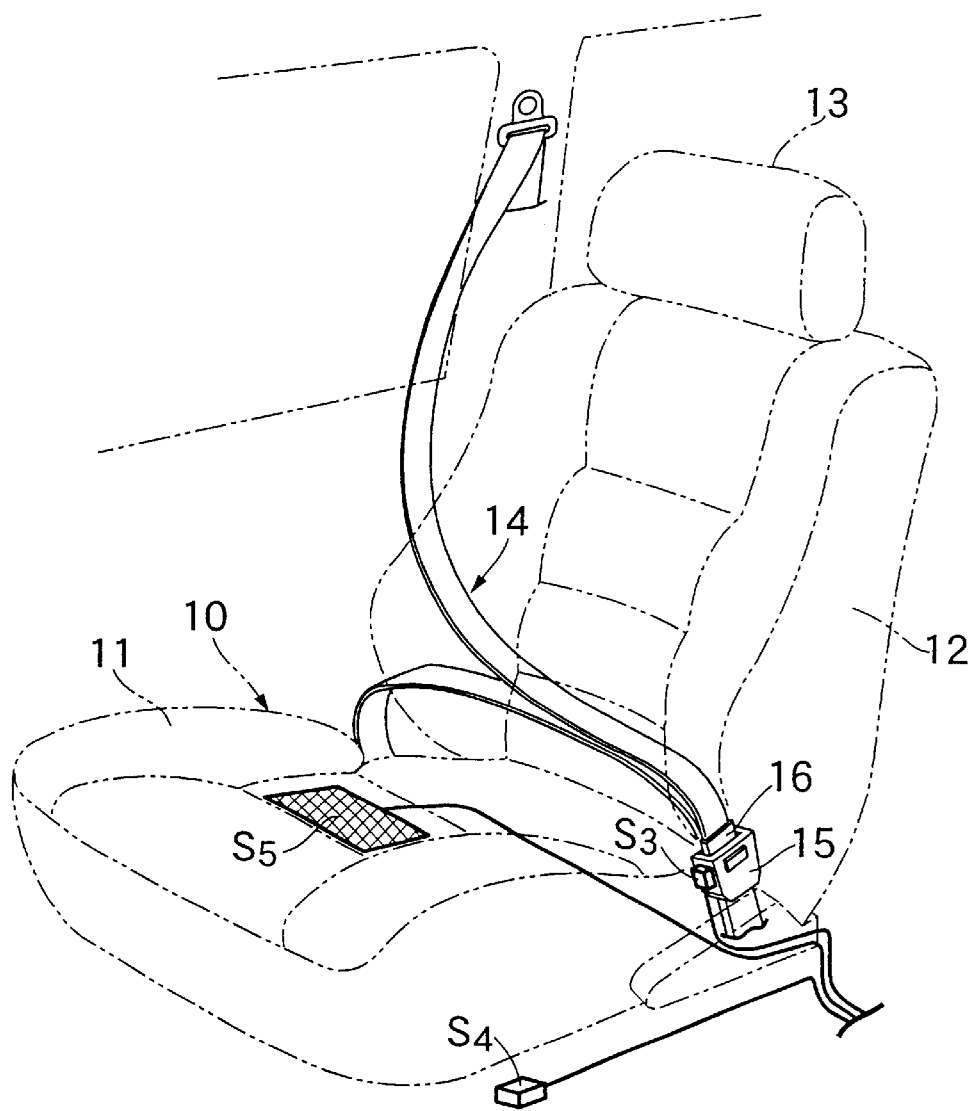

As shown in FIG. 5, a driver's seat 10 comprises a seat cushion 11, a seat back 12 and a head rest 13. The seat belt wear state sensor $S_3$, which forms the seat belt wear state detecting means of the present embodiment, is placed inside a buckle 15 of a seat belt 14 and detects the wear state of the seat belt 14 based on the binding of a tongue 16 to the buckle 15. The lengthways position sensor S4, which forms the lengthways position detecting means of the present embodiment, detects the lengthways position of the seat 10 based on the relative position of the seat cushion 11 relative to a seat rail which is placed on the floor. The seating state sensor $S_5$, which forms the seating state detecting means of the present embodiment, detects the seating state of an occupant by means of a pressure sensitive element which is installed inside the seat cushion 11.

The electronic control unit U controls operation of the above-mentioned electronically controlled vacuum booster 2 and the hydraulic control device 4 based on signals from the radar device $S_1$, forming the object detecting means of the present embodiment, and signals from each of the sensors $S_2$ to $S_5$.

Figure 3:
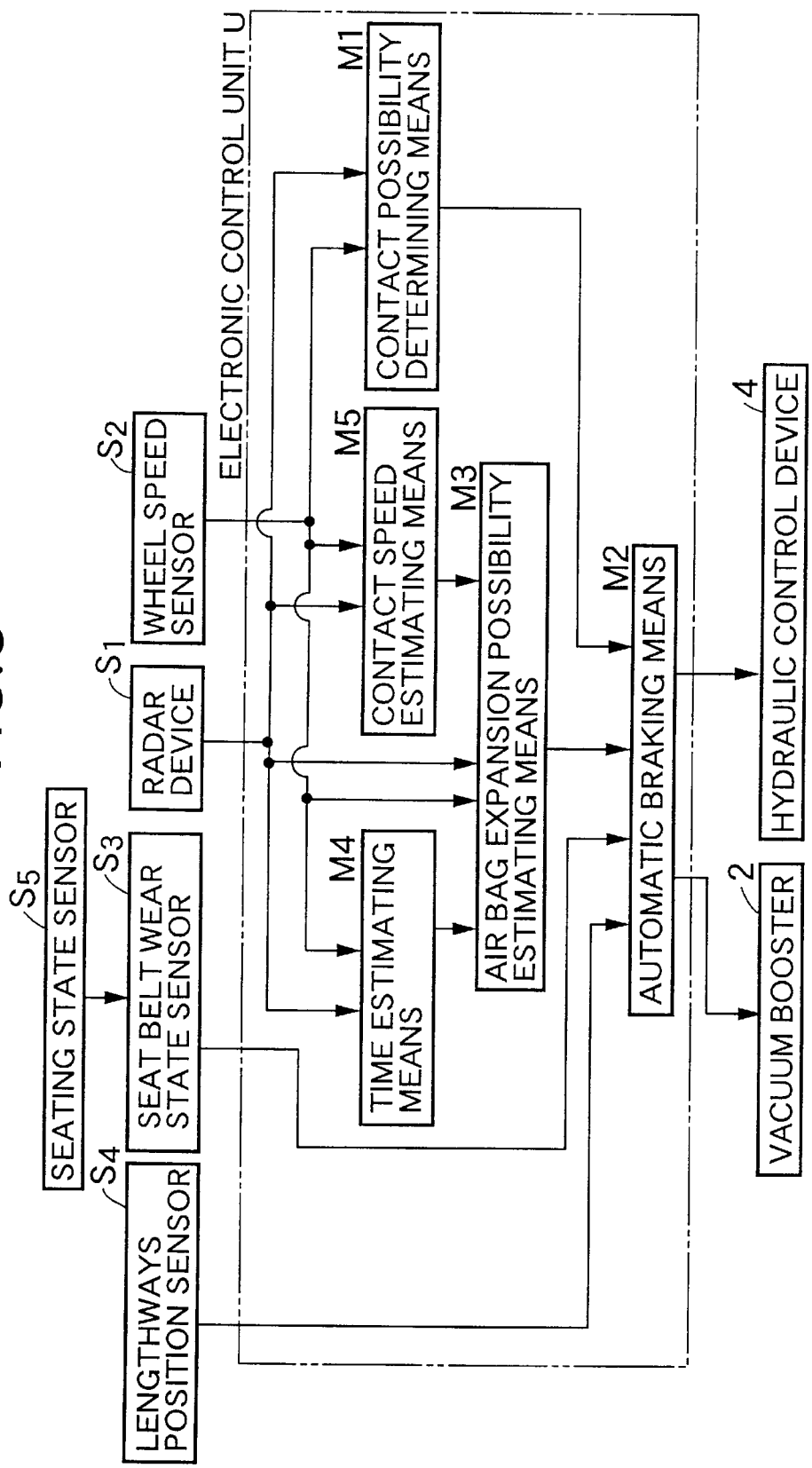

As shown in FIG. 3, the electronic control unit U comprises a contact possibility determining means M1, an automatic braking means M2, an air bag expansion possibility estimating means M3, a time estimating means M4 and a contact speed estimating means M5.

The contact possibility determining means M1 determines the possibility of the subject vehicle coming into contact with an object based on the distance and the relative speed between the subject vehicle and the object detected by the radar device $S_1$ and the speed of the subject vehicle detected by the wheel speed sensors $S_2$ . . . . When the contact possibility determining means M1 determines that there is a possibility of contact, the automatic braking means M2 operates the electronically controlled vacuum booster 2 in order to prevent the contact and thus generating a hydraulic brake pressure for the master cylinder 3. By supplying this hydraulic brake pressure to the brake calipers $5_{FR}$, $5_{FL}$, $5_{RR}$, $5_{RL}$ via the hydraulic control device 4, a braking force is generated.

At this stage, according to the possibility of expansion of an air bag 7, that has been estimated by the air bag expansion possibility estimating means M3, the braking force that is generated by the automatic braking means M2 is changed. More specifically, when there is a possibility of expansion, the deceleration rate that is generated by automatic braking is reduced to make it difficult for the occupant to move forwards due to the inertia of the deceleration thus preventing proximate expansion of the air bag 7. There are four types of methods for determining the possibility of expansion of the air bag 7, which are summarized as follows:

(1) The speed of the subject vehicle at the time when automatic braking is started is calculated based on the outputs from the wheel speed sensors $S_2$ . . . . When the vehicle speed is high, it is estimated that there is a possibility of expansion.

(2) The relative speed, between the subject vehicle and the object at the time when automatic braking is started, is calculated based on the output from the radar device $S_1$. When the relative speed is high, it is estimated that there is a possibility of expansion.

(3) The time taken to reach the point when the subject vehicle comes into contact with the object is estimated by the time estimating means M4 based on the outputs from the radar device $S_1$ and the wheel speed sensors $S_2$ . . . . When the estimated time is short, it is estimated that there is a possibility of expansion.

(4) The contact speed of the subject vehicle, at the time when the subject vehicle comes into contact with the object, is calculated by the contact speed estimating means M5 based on the outputs from the radar device $S_1$ and the wheel speed sensors $S_2$ . . . . When the contact speed is high, it is estimated that there is a possibility of expansion.

Furthermore, the braking force that is generated by the automatic braking means M2 changes according to the state in which the seat belt 14 is worn and the lengthways position of the seat 10. That is to say, in the case where the sitting of the occupant on the seat 10 is detected by the seating state sensor $S_5$ and wearing of the seat belt 14 is detected by the seat belt wear state sensor $S_3$, since the occupant is restrained in the seat 10 and there is no possibility of proximate expansion, control of the braking force in order to reduce the deceleration rate of the automatic braking is not carried out. When the lengthways position of the seat 10 is detected by the lengthways position sensor $S_4$ as being shifted forwards, since the possibility of proximate expansion increases, control of the braking force in order to further reduce the deceleration rate of the automatic braking is carried out.

Figure 4:
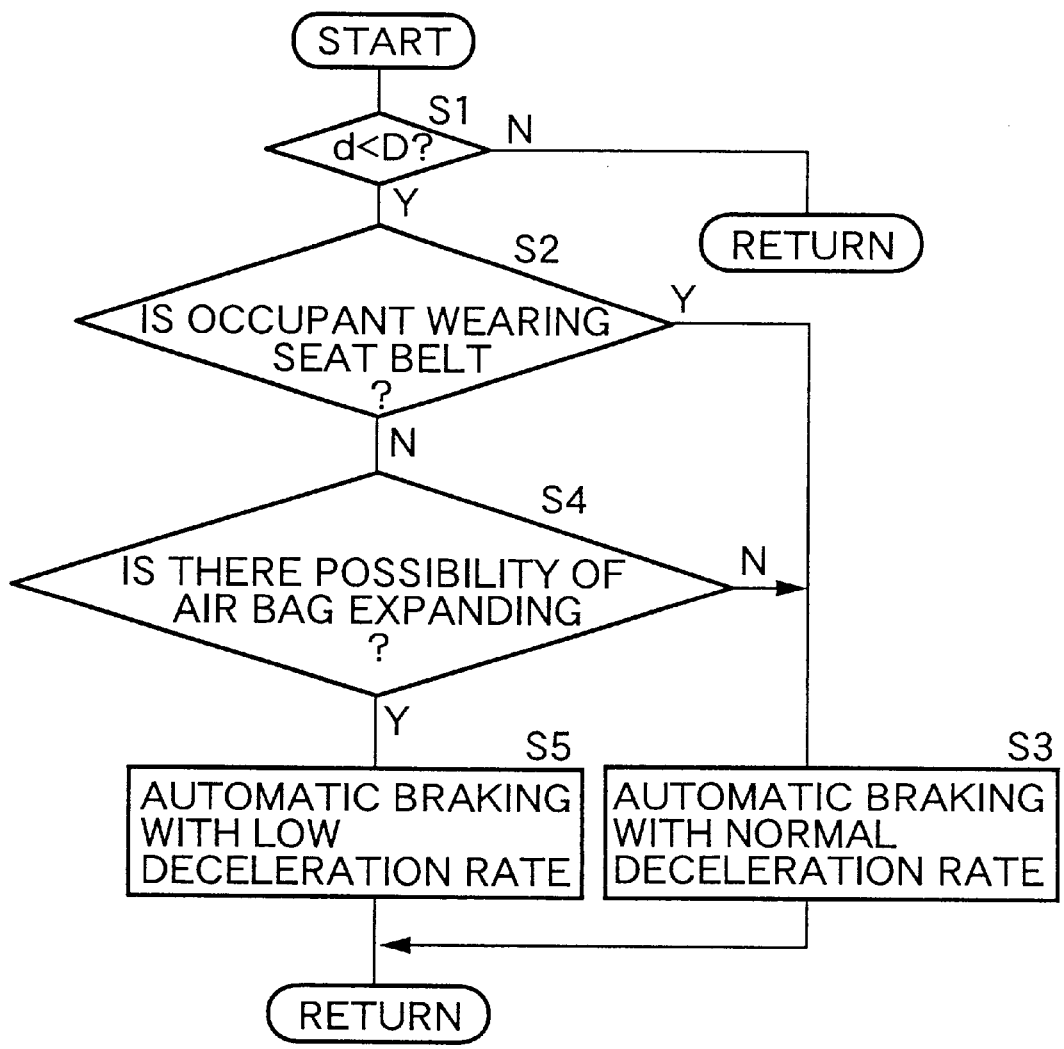

The operation of the present embodiment is explained below with reference to the flow chart shown in FIG. 4.

First, in Step S1 the current relative distance d, between the subject vehicle and the object, is detected by a radar device $S_1$. The relative distance D, at the time when the automatic braking is started, is also calculated. Automatic braking is necessary to prevent contact between the subject vehicle and the object. Calculation of the relative distance D is based on the current relative distance d, the relative speed $\Delta V$, and the speed $V_0$ of the subject vehicle detected by the wheel speed sensors $S_2$. The relative speed $\Delta V$ is between the subject vehicle and the object detected by the radar device $S_1$. When the current relative distance d between the subject vehicle and the object is less than the relative distance D between the subject vehicle and the object at which automatic braking should be started, that is to say, when there is a possibility of contact because the subject vehicle is too close to the object, the flow chart moves on to Step S2 in order to carry out automatic braking. The operation of the above-mentioned Step S1 is carried out by the contact possibility determining means M1.

In the subsequent Step S2, the seat belt wear state sensor $S_3$ estimates whether the occupant is wearing the seat belt 14 or not. This estimation is only carried out for the seat 10 which is detected, by the seating state sensor $S_5$, as being used or occupied by the occupant. This is because the seat belt 14 of the seat 10, which is not used by the occupant is always in a non-worn state. Therefore it is meaningless to sense a wear state of a non-occupied seat. In the above-mentioned Step S2, if it is detected that the occupant is wearing the seat belt 14, then the occupant does not move forwards, due to inertia even when full braking force is applied by the automatic braking. Thus, there is no possibility of proximate expansion of the air bag 7, and therefore automatic braking is carried out with a normal deceleration rate (e.g. 0.4 G) in Step S3 to prevent contact with the object.

On the other hand, if it is detected that the occupant is not wearing the seat belt 14 in the above-mentioned Step S2, the flow chart moves on to Step S4. The possibility of the air bag 7 expanding is estimated by the air bag expansion possibility estimating means M3. Methods of estimating the possibility of the air bag 7 expanding are explained in detail below. If it is estimated that there is no possibility of the air bag expanding in Step S4, automatic braking is carried out with a normal deceleration rate in the above-mentioned Step S3. If it is estimated that there is a possibility of expansion, automatic braking is carried out in Step S5 with a deceleration rate (e.g. 0.2 G) lower than a normal deceleration rate. Thus, if automatic braking is carried out with a low deceleration rate, there is no possibility of even the occupant, who is not wearing the seat belt 14, moving forwards due to inertia and even when the air bag 7 expands, proximate expansion is reliably prevented.

Methods of estimating the possibility of the air bag 7 expanding, using the air bag expansion possibility estimating means M3, are explained in detail below.

(1) Method using the speed of the subject vehicle at the time when automatic braking is started The speed $V_0$ of the subject vehicle at the time when automatic braking is started which has been detected by the wheel speed sensors $S_2$ . . . is compared with a predetermined vehicle speed threshold value $V_{LIM}$. When the condition $V_0 > V_{LIM}$ is satisfied, it is estimated that there is a possibility of the air bag 7 expanding.

(2) Method using the relative speed between the subject vehicle and an object at the time when automatic braking is started The relative speed $\Delta V$ between the subject vehicle and an object (relative speed in the direction in which the distance between the vehicles decreases) at the time when automatic braking is started which has been detected by the radar device $S_1$ is compared with a predetermined relative speed threshold value $\Delta V_{LIM}$. When the condition $\Delta V > \Delta V_{LIM}$ is satisfied, it is estimated that there is a possibility of the air bag 7 expanding.

(3) Method using the predicted contact time estimated by the time estimating means M4

The speed $V_1$ of the object is first calculated using equation (1) below from the relative speed $\Delta V$ detected by the radar device $S_1$ and the speed $V_0$ of the subject vehicle detected by the wheel speed sensors $S_2$ . . . .

$$V_1 = V_0 - \Delta V \tag{1}$$

If the time taken for the subject vehicle to come into contact with the object is t, the normal deceleration rate of automatic braking is a and the distance between the subject vehicle and the object at the time when automatic braking is started is D, the following equation can be derived.

$$D + V_1 \cdot t = V_0 \cdot t - (\alpha \cdot t^2/2) \tag{2}$$

The above-mentioned equation (2) is a quadratic equation with regard to t, and among its two solutions, the solution tc that has the smaller absolute value is the predicted contact time.

$$tc = [-(V_1 - V_0) - \{(V_1 - V_0)^2 - 2\alpha D\}^{1/2}]/\alpha \tag{3}$$

When tc in the above-mentioned equation (3) cannot be obtained as a real number, that is to say, $(V_1-V_0)^2/2\alpha D$ becomes negative and the following equation (4) is satisfied, there is no contact, and in this case, automatic braking is carried out at a normal deceleration rate.

$$(V_1 - V_0)^2 / 2\alpha < D \tag{4}$$

When the above-mentioned predicted contact time tc can be obtained as a real number and contact is possible, the predicted contact time tc is compared with a predetermined threshold value $t_{LIM}$. When the condition $tc < t_{LIM}$ is satisfied, it is estimated, that there is a possibility of the air bag 7 expanding.

(4) Method using the contact speed estimated by the contact speed estimating means M5

When the subject vehicle decelerates at a normal deceleration rate during automatic braking, the speed of the subject vehicle (contact speed) after the predicted contact time tc which is obtained from the above-mentioned equation (3) can be given by to $V_0 - \alpha - tc$. When this contact speed exceeds a lower limit speed VNB for the air bag 7 expanding, that is to say, the condition $$V_0 - \alpha \cdot tc > V_{A/B} \tag{5}$$

is satisfied, it is estimated that there is a possibility of the air bag 7 expanding. The following equation can be obtained by inserting the predicted contact time tc from the above-mentioned equation (3) into the above-mentioned equation (4).

$$V_1 + \{(V_1 - V_0)^2 2\alpha \cdot D\}^{1/2} > V_{A/B} \tag{6}$$

In the explanation described above, the deceleration rate of the automatic braking, when there is a possibility of the air bag 7 expanding, is set at a constant value (e.g., 0.2 G), but the deceleration rate can be varied according to the distance between the air bag 7 and the occupant. More particularly, since proximate expansion can be easily caused when the position of the seat 10 detected by the lengthways position sensor $S_4$ is in a forward position and the distance between the occupant and the air bag 7 is smaller than the minimum distance, the deceleration rate of the automatic braking can be changed so as to be still lower than the normal deceleration rate according to the decrease in the above-mentioned distance.

As hereinbefore described, when the occupant wears the seat belt 14, automatic braking is carried out at a normal deceleration rate. When the occupant does not wear the seat belt 14, automatic braking is carried out at a normal deceleration rate as long as there is no possibility of the air bag 7 expanding. Therefore it is possible to prevent contact with the object by generating the maximum braking force while preventing proximate expansion of the air bag.

Figure 6:
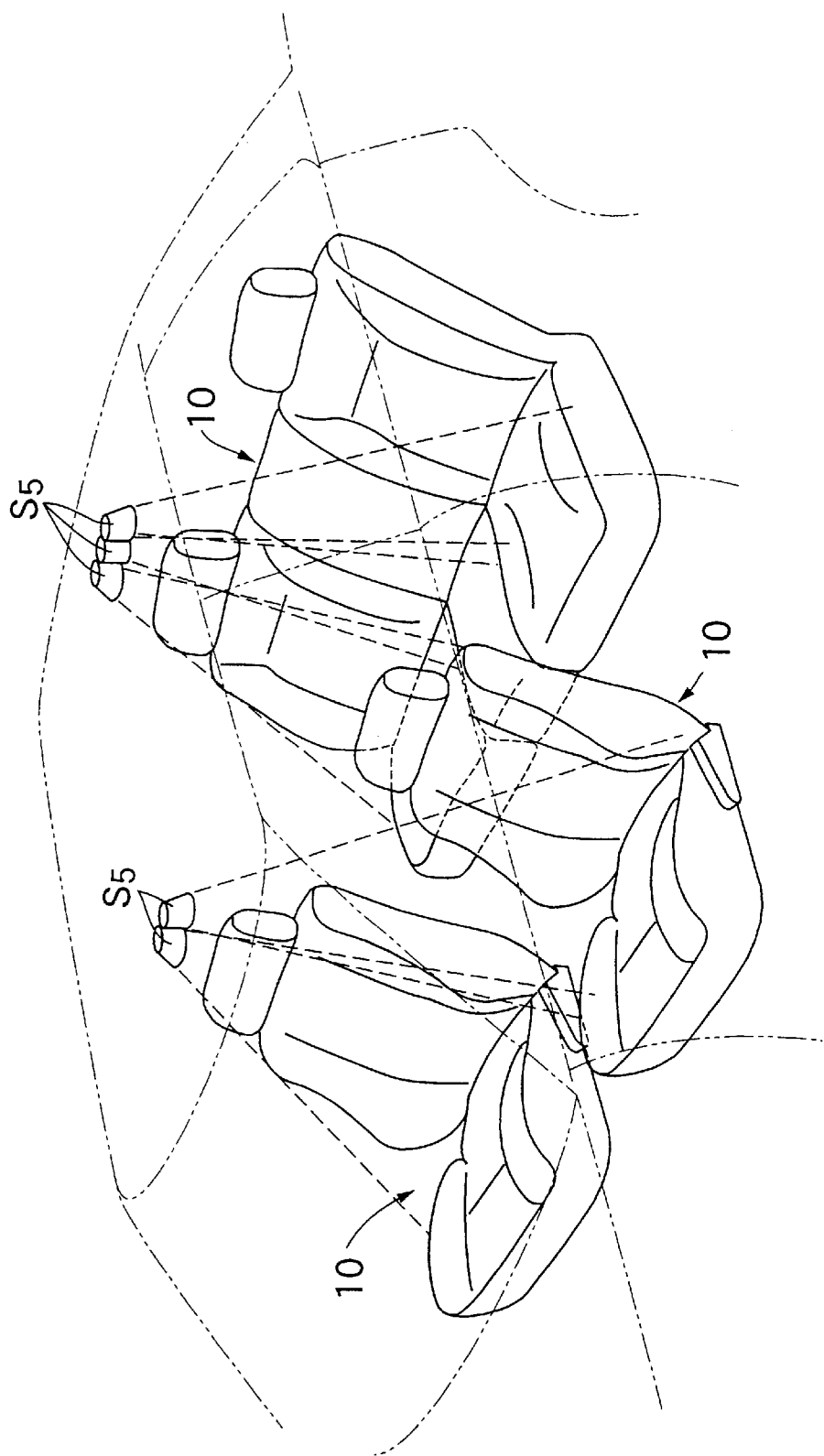

In the embodiment, a radar device $S_1$ is illustrated as the object detecting means, but an imaging means such as a camera can be employed as the object detecting means. Furthermore, instead of detecting the lengthways position of a seat 10 by a lengthways position sensor $S_4$ as shown in FIG. 5, the lengthways position of the occupant may be directly detected by non-contact type lengthways position sensors $S_5$ . . . using ultrasonic, etc. as shown in FIG. 6.

As hereinbefore described, in accordance with the invention, when it is determined that there is a possibility of the subject vehicle coming into contact with an object, the braking force used for the automatic braking is changed based on the state in which the seat belt is worn by the occupant and the possibility of the air bag expanding at the time when automatic braking is carried out in order to prevent contact with the object. Therefore, when there is no possibility of proximate expansion of the air bag, sufficient braking force is generated to prevent contact with the object. When there is a possibility of proximate expansion of the air bag, the braking force is suppressed so as to prevent the occupant from moving forwards due to the inertia resulting from the braking and approaching the air bag.

Furthermore, when the speed of the subject vehicle is high, since it is difficult to prevent contact with the object, it can be determined that there is a high possibility of the air bag expanding. When the speed of the subject vehicle is low, since it is easy to prevent contact with the object, it can be determined that there is a low possibility of the air bag expanding.

Additionally, when the relative speed between the subject vehicle and the object is high, since it is difficult to prevent contact with the object, it can be determined that there is a high possibility of the air bag expanding. When the relative speed between the subject vehicle and the object is low, since it is easy to prevent contact with the object, it can be determined that there is a low possibility of the air bag expanding.

Also, the time taken for the subject vehicle to come into contact with the object is estimated based on a) the speed of the subject vehicle, b) the relative speed between the subject vehicle and the object detected and c) the distance between the subject vehicle and the object. When the estimated time is short, since it is difficult to prevent contact with the object, it can be determined that there is a high possibility of the air bag expanding. When the estimated time is long, since it is easy to prevent contact with the object, it can be determined that there is a low possibility of the air bag expanding.

Furthermore, the contact speed, at the time when the subject vehicle comes into contact with the object, is estimated based on the speed of the subject vehicle, the relative speed between the subject vehicle and the object detected and the distance between the subject vehicle and the object. When the contact speed is high, since the impact from the contact is large, it can be determined that there is a high possibility of the air bag expanding. When the contact speed is low, since the impact from the contact is small, it can be determined that there is a low possibility of the air bag expanding.

Additionally, when there is a possibility that the occupant might move forwards and approach the air bag, due to inertia if a strong braking force is applied when the occupant is not wearing a seat belt, the braking force used for the automatic braking can be reduced so as to prevent the occurrence of proximate expansion. Furthermore, when there is no possibility that the occupant might move forwards, due to inertia even if a strong braking force is applied when the occupant is wearing a seat belt, sufficient braking force used for automatic braking is generated to effectively prevent contact.

Also, when there is a possibility of the air bag expanding, it is possible to prevent the occurrence of proximate expansion by decreasing the braking force used for the automatic braking. When there is no possibility of the air bag expanding, it is possible to effectively prevent contact by generating a sufficient level of braking force for the automatic braking.

Since the braking force used for the automatic braking is changed according to the lengthways position of the occupant or the seat, when the distance between the occupant and the air bag is short, proximate expansion can be more reliably prevented by decreasing the braking force.

Since the state in which a seat belt is worn is detected for a seat on which an occupant sits, it is possible to prevent meaningless detecting of the state for seats on which no occupants are seated.

The embodiment of the present invention is described in detail above, but the present invention can be modified in a variety of ways without departing from the spirit and scope of the invention.

What is claimed is:

1. A vehicle travel safety device comprising:
    an object detecting means for detecting an object present in a direction in which a subject vehicle travels;
    a contact possibility determining means for determining a possibility of the subject vehicle coming into contact with a detected object;
    an automatic braking means for automatically braking the subject vehicle when the contact possibility determining means determines that there is a possibility of contact;
    an air bag which is expanded by an impact resulting from contact of the subject vehicle with the object so as to protect an occupant;
    a seat belt which restrains the occupant in a seat;
    a seat belt wear state detecting means for detecting a state in which the seat belt is worn by an occupant; and
    an air bag expansion possibility estimating means for estimating a possibility of the air bag expanding at a time when automatic braking is operated by the automatic braking means;
    wherein the automatic braking means changes braking force used for automatic braking based on the result of the detecting made by the seat belt wear state detecting means and the result of the estimation made by the air bag expansion possibility estimating means.

2. The vehicle travel safety device according to claim 1, further comprising a vehicle speed detecting means for detecting a speed of the subject vehicle, wherein the air bag expansion possibility estimating means estimates the possibility of the air bag expanding based on the speed of the subject vehicle at the time when the automatic braking means starts automatic braking.

3. The vehicle travel safety device according to claim 1, wherein the air bag expansion possibility estimating means estimates the possibility of the air bag expanding based on relative speed between the subject vehicle and the object detected by the object detecting means.

4. The vehicle travel safety device according to claim 1, further comprising a time estimating means for estimating time taken for the subject vehicle to come into contact with the object based on a) the speed of the subject vehicle detected by a vehicle speed detecting means, b) a relative speed between the subject vehicle and the object detected by the object detecting means and c) a distance between the subject vehicle and the object detected by the object detecting means, wherein the air bag expansion possibility estimating means estimates the possibility of the air bag expanding based on the time estimated by the time estimating means.

5. The vehicle travel safety device according to claim 1, further comprising a contact speed estimating means for estimating the contact speed at a time when the subject vehicle comes into contact with the object based on a) the speed of the subject vehicle detected by a vehicle speed detecting means, b) a relative speed between the subject vehicle and the object detected by the object detecting means and c) a distance between the subject vehicle and the object detected by the object detecting means, wherein the air bag expansion possibility estimating means estimates the possibility of the air bag expanding based on the contact speed estimated by the contact speed estimating means.

6. The vehicle travel safety device according to claim 2, wherein when the seat belt wear state detecting means detects that an occupant is not wearing the seat belt, the automatic braking means decreases the braking force used for automatic braking.

7. The vehicle travel safety device according to claim 3, wherein when the seat belt wear state detecting means detects that an occupant is not wearing the seat belt, the automatic braking means decreases the braking force used for automatic braking.

8. The vehicle travel safety device according to claim 4, wherein when the seat belt wear state detecting means detects that an occupant is not wearing the seat belt, the automatic braking means decreases the braking force used for automatic braking.

9. The vehicle travel safety device according to claim 5, wherein when the seat belt wear state detecting means detects that an occupant is not wearing the seat belt, the automatic braking means decreases the braking force used for automatic braking.

10. The vehicle travel safety device according to claim 2, wherein when the air bag expansion possibility estimating means estimates that there is a possibility of the air bag expanding, the automatic braking means decreases the braking force used for automatic braking.

11. The vehicle travel safety device according to claim 3, wherein when the air bag expansion possibility estimating means estimates that there is a possibility of the air bag expanding, the automatic braking means decreases the braking force used for automatic braking.

12. The vehicle travel safety device according to claim 4, wherein when the air bag expansion possibility estimating means estimates that there is a possibility of the air bag expanding, the automatic braking means decreases the braking force used for automatic braking.

13. The vehicle travel safety device according to claim 5, wherein when the air bag expansion possibility estimating means estimates that there is a possibility of the air bag expanding, the automatic braking means decreases the braking force used for automatic braking.

14. The vehicle travel safety device according to claim 6, wherein when the air bag expansion possibility estimating means estimates that there is a possibility of the air bag expanding, the automatic braking means decreases the braking force used for automatic braking.

15. The vehicle travel safety device according to claim 10, further comprising a lengthways position detecting means for detecting a lengthways position of the seat or an occupant at a time when the automatic braking means is not operating, wherein the automatic braking means changes braking force used for automatic braking based on the lengthways position of the seat or the occupant detected by the lengthways position detecting means.

16. The vehicle travel safety device according to claim 11, further comprising a lengthways position detecting means for detecting a lengthways position of the seat or an occupant at a time when the automatic braking means is not operating, wherein the automatic braking means changes braking force used for automatic braking based on the lengthways position of the seat or the occupant detected by the lengthways position detecting means.

17. The vehicle travel safety device according to claim 12, further comprising a lengthways position detecting means for detecting a lengthways position of the seat or an occupant at a time when the automatic braking means is not operating, wherein the automatic braking means changes the braking force used for automatic braking based on the lengthways position of the seat or the occupant detected by the lengthways position detecting means.

18. The vehicle travel safety device according to claim 13, further comprising a lengthways position detecting means for detecting a lengthways position of the seat or an occupant at a time when the automatic braking means is not operating, wherein the automatic braking means changes the braking force used for automatic braking based on the lengthways position of the seat or the occupant detected by the lengthways position detecting means.

19. The vehicle travel safety device according to claim 14, further comprising a lengthways position detecting means for detecting a lengthways position of the seat or an occupant at a time when the automatic braking means is not operating, wherein the automatic braking means changes the braking force used for automatic braking based on the lengthways position of the seat or the occupant detected by the lengthways position detecting means.

20. The vehicle travel safety device according to claim 1, further comprising a seating state detecting means for detecting a seating state of an occupant on the seat, wherein the seat belt wear state detecting means detects the state in which the seat belt is worn by an occupant on the seat which is detected as being in a seated state by the seating state detecting means.

21. The vehicle travel safety device according to claim 2, further comprising a seating state detecting means for detecting a seating state of an occupant on the seat, wherein the seat belt wear state detecting means detects the state in which the seat belt is worn by an occupant on the seat which is detected as being in a seated state by the seating state detecting means.

22. The vehicle travel safety device according to claim 3, further comprising a seating state detecting means for detecting a seating state of an occupant on the seat, wherein the seat belt wear state detecting means detects the state in which the seat belt is worn by an occupant on the seat which is detected as being in a seated state by the seating state detecting means.

23. The vehicle travel safety device according to claim 4, further comprising a seating state detecting means for detecting a seating state of an occupant on the seat, wherein the seat belt wear state detecting means detects the state in which the seat belt is worn by an occupant on the seat which is detected as being in a seated state by the seating state detecting means.

24. The vehicle travel safety device according to claim 5, further comprising a seating state detecting means for detecting a seating state of an occupant on the seat, wherein the seat belt wear state detecting means detects the state in which a seat belt is worn by an occupant on the seat which is detected as being in a seated state by the seating state detecting means.

* * * * *